United States Patent [19]

Ueda et al.

[11] Patent Number: 5,427,226

[45] Date of Patent: Jun. 27, 1995

[54] APPARATUS FOR TRANSPORTING SOLID MASSES

[75] Inventors: Michio Ueda; Tetsuya Iuchi; Takao Miki; Hisanori Hamada, all of Tokushima, Japan

[73] Assignee: Shikoku Kakoki Co., Ltd., Tokushima, Japan

[21] Appl. No.: 238,846

[22] Filed: May 6, 1994

[30] Foreign Application Priority Data

Jun. 5, 1993 [JP] Japan .................................. 5-105447

[51] Int. Cl.⁶ .............................................. B65G 47/30
[52] U.S. Cl. .............................. 198/418.6; 198/463.2; 198/732
[58] Field of Search ................. 198/418, 418.1, 418.5, 198/418.6, 419.3, 732, 463.2, 803.14

[56] References Cited

U.S. PATENT DOCUMENTS

| 3,016,665 | 1/1962 | Barrett . | |
|---|---|---|---|
| 4,122,939 | 10/1978 | Langen | 198/803.14 X |
| 4,558,777 | 12/1985 | Francioni | 198/463.2 X |
| 4,682,684 | 7/1987 | Löthman | 198/732 X |
| 4,731,975 | 3/1988 | Rossier . | |
| 4,925,006 | 5/1990 | Lentz et al. | 198/419.3 X |
| 4,940,129 | 7/1990 | Walz | 198/418.6 |

FOREIGN PATENT DOCUMENTS

| 0082120 | 6/1983 | European Pat. Off. . |
| 2585329 | 1/1987 | France . |
| 5-170332 | 7/1993 | Japan . |

Primary Examiner—D. Glenn Dayoan
Attorney, Agent, or Firm—Armstrong, Westerman, Hattori, McLeland & Naughton

[57] ABSTRACT

An apparatus for transporting solid masses includes a continuously drivable first conveyor, intermittently drivable second conveyor and bridge plate interconnecting the transport path of the first conveyor and the second conveyor. The first conveyor has push bars for pushing a solid mass along the transport path of the first conveyor and forward from the terminal end of such transport path. The second conveyor has holders and means for transporting the holders, at each time of transporting, a distance twice the pitch of the holders. The solid mass is pushed out on to the bridge plate, slidingly pushed forward on the plate by a main pusher and thereby forwardly pushed out from the front end of the plate. The bridge plate has a by-pass gate, which is provided with a movable gate plate for opening and closing the gate. While the solid mass is being pushed by the main pusher, another solid mass immediately following the mass pushed by the pusher is pushed out from the first conveyor to a position over the gate by a subpusher.

3 Claims, 3 Drawing Sheets

APPARATUS FOR TRANSPORTING SOLID MASSES

BACKGROUND OF THE INVENTION

The present invention relates to transport apparatus for transferring solid masses from one conveyor to another conveyor for use with filling machines for dessert, snack food or like material in the form of solid masses.

Apparatus of the type mentioned are known which comprise a continuously drivable first conveyor for transporting solid masses at a predetermined spacing so as to push out each mass forward from the terminal end of its transport path, a bridge plate so disposed as to receive the solid mass as pushed out forward from the first conveyor, a pusher for pushing the received solid mass forward on the bridge plate in sliding contact therewith and pushing out the solid mass forward from the front end of the bridge plate, and an intermittently drivable second conveyor having a plurality of holders arranged at a predetermined spacing in a transport direction, the second conveyor being so disposed that the solid mass pushed out forward from the bridge plate is received by the holder as held at rest at a receiving position.

To give an increased transport capacity to the known apparatus, there arises a need to operate each of the first and second conveyors at a higher speed. Although the operating speed of the first conveyor can be increased without difficult problems, an increase in the operating speed of the second conveyor requires a shortened cycle time for the intermittently driven conveyor. However, this is limited mechanically and is not easy to accomplish, consequently limiting the increase in the transport capacity of the overall apparatus.

SUMMARY OF THE INVENTION

The main object of the present invention is to overcome the above problem and to provide a transport apparatus for solid masses which is given a greatly increased transport capacity without shortening the cycle time of the intermittently driven conveyor.

The present invention provides an apparatus for transporting solid masses which comprises a continuously drivable first conveyor having a transport path extending forward; an intermittently drivable second conveyor having a transport path extending forward from a position in front of the first conveyor, the second conveyor having a plurality of holders arranged with a predetermined pitch in a transport direction, the second conveyor having means for transporting the holders a distance twice the pitch of the holders at a time; a bridge plate so disposed as to connect the front end of the transport path of the first conveyor with the front holder of front and rear two holders stopped at the rear end of the transport path of the second conveyor, the bridge plate being provided with a by-pass gate between front and rear ends thereof; a movable gate plate for opening and closing the by-pass gate to connect the by-pass gate with the rear holder of the front and rear two holders stopped at the rear end of the transport path of the second conveyor when opening the gate and to become flush with the bridge plate when closing the gate; a main pusher for slidingly pushing the solid mass forward on the bridge plate and pushing out the mass forward from the front end of the bridge plate; a subpusher for forwardly pushing another solid mass immediately following the solid mass pushed by the main pusher from the front end of the transport path of the first conveyor to a position over the by-pass gate while the main pusher pushes the mass forward; and opening-closing means for closing the gate plate when the solid mass pushed by the main pusher passes over the by-pass gate and opening the gate plate after the passage and by the time the solid mass pushed by the subpusher reaches the position over the by-pass gate.

With the present transport apparatus, one solid mass is pushed out onto the bridge plate by the first conveyor, received by the bridge plate and then transported onto the second conveyor by being pushed forward by the main pusher. In the meantime, another solid mass is transported from the first conveyor to the second conveyor via the by-pass gate by the subpusher. Thus, the two solid masses are transferred from the first conveyor to the second conveyor at a time, and two holders receiving the respective solid masses are sent forward a distance at a time by the operation of the second conveyor. This achieves a great increase in the transport capacity without shortening the cycle time of the intermittently drivable conveyor.

DESCRIPTION OF THE PREFERRED EMBODIMENTS

An embodiment of the present invention will be described below with reference to the drawings. In the following description, the terms "front" and "rear" are used with reference to FIG. 1; the right-hand side of FIG. 1 will be referred to as "front", and the opposite side thereof as "rear".

Figure 1:
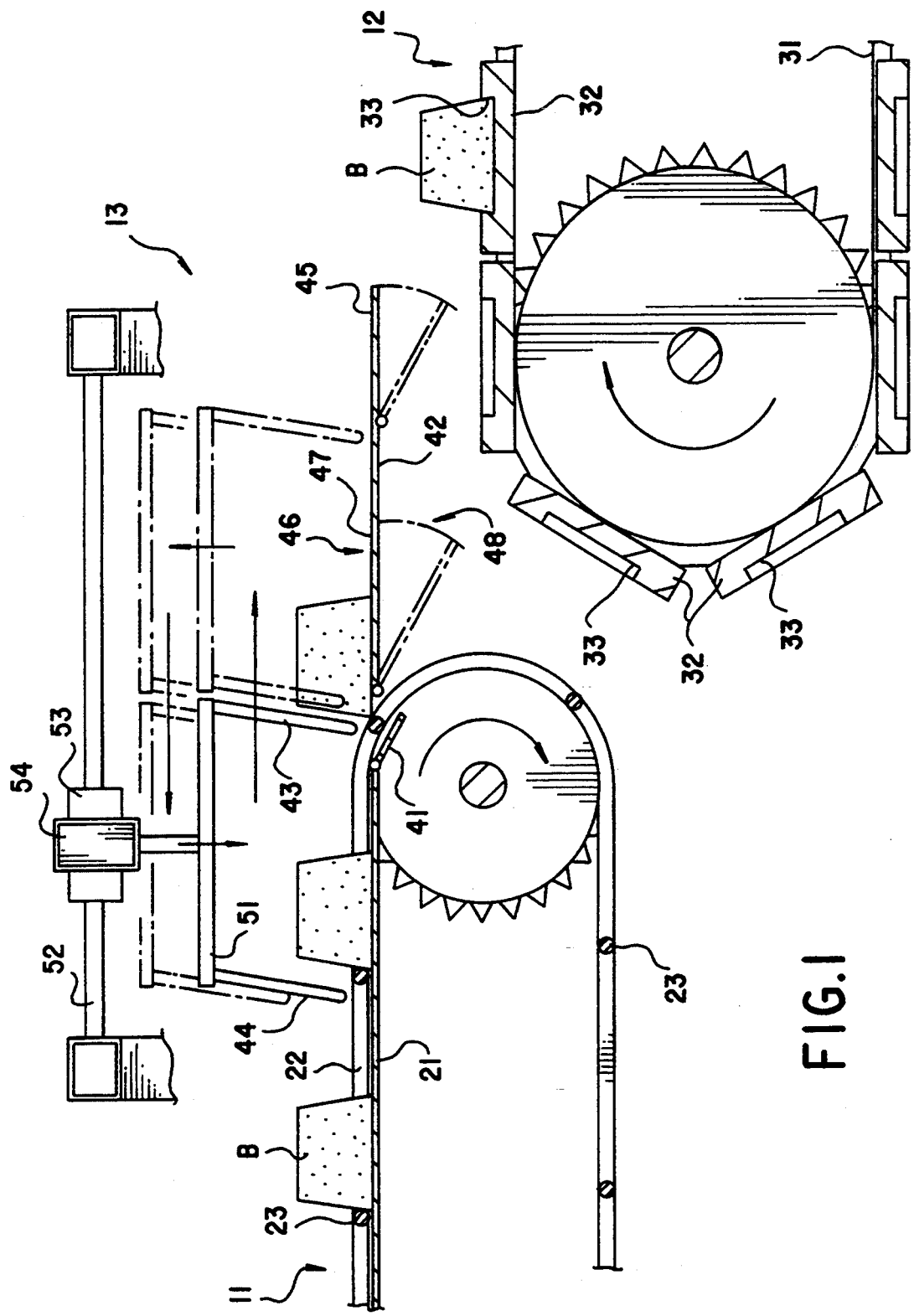
FIG. 1 is a vertical view in longitudinal section of a transport apparatus embodying the invention.

FIG. 1 shows a transport apparatus for solid masses, which comprises a continuously drivable first conveyor 11 having a transport path extending forward, an intermittently drivable second conveyor 12 disposed in front of the conveyor 11, and a transfer device 13 disposed at the front end of the first conveyor 11 to the rear end of the second conveyor 12.

The second conveyor 12 has a transport path at a level lower than that of the transport path of the first conveyor 11 by more than the height of the solid mass B.

Although the transport apparatus is adapted to forwardly transport solid masses B in a multiplicity of parallel rows, e.g., in 10 parallel rows, the following description will be given on the assumption that masses B are transported in a single row for the sake of simplicity.

The first conveyor 11 comprises a forwardly extending horizontal slide plate 21, a pair of endless chains 22 arranged on opposite sides of the slide plate 21, and push bars 23 arranged at a predetermined spacing and connected between the chains 22.

The second conveyor 12 is a slat conveyor and has a multiplicity of slat arranged at a specified spacing, connected between a pair of opposed endless chains 31 and each providing a holder 32. A cavity 33 for positioning the solid mass B is formed in the upper side of the holder 32.

Figure 2A:
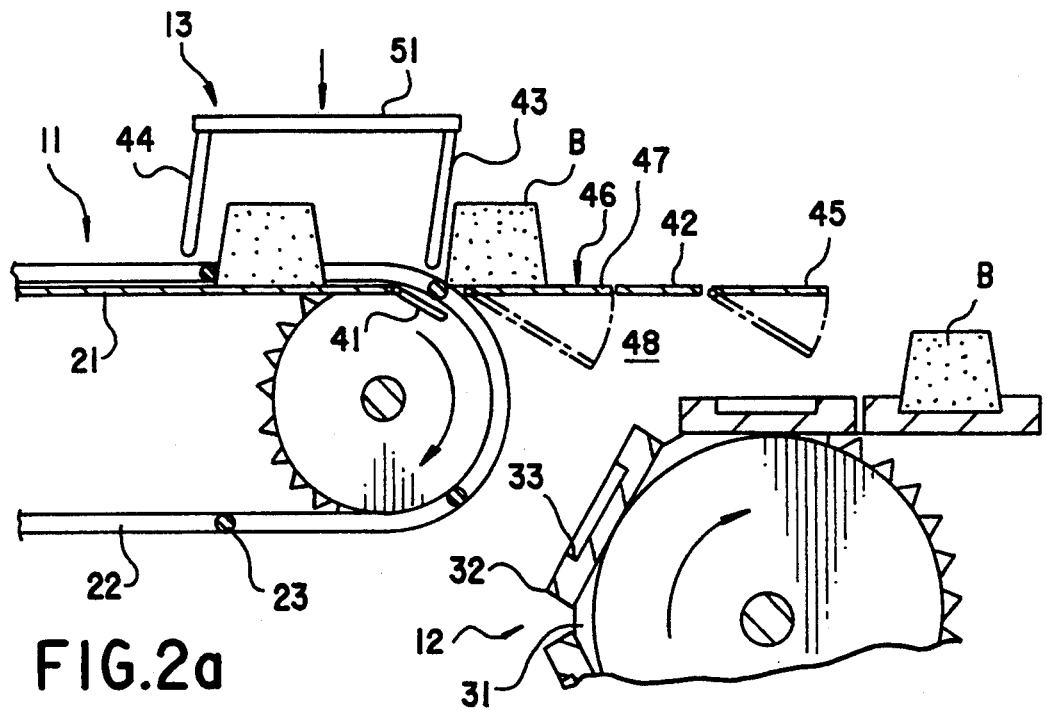
FIGS. 2a, 2b illustrate one phase of the transport operation of the apparatus of FIG. 1.
Figure 3A:
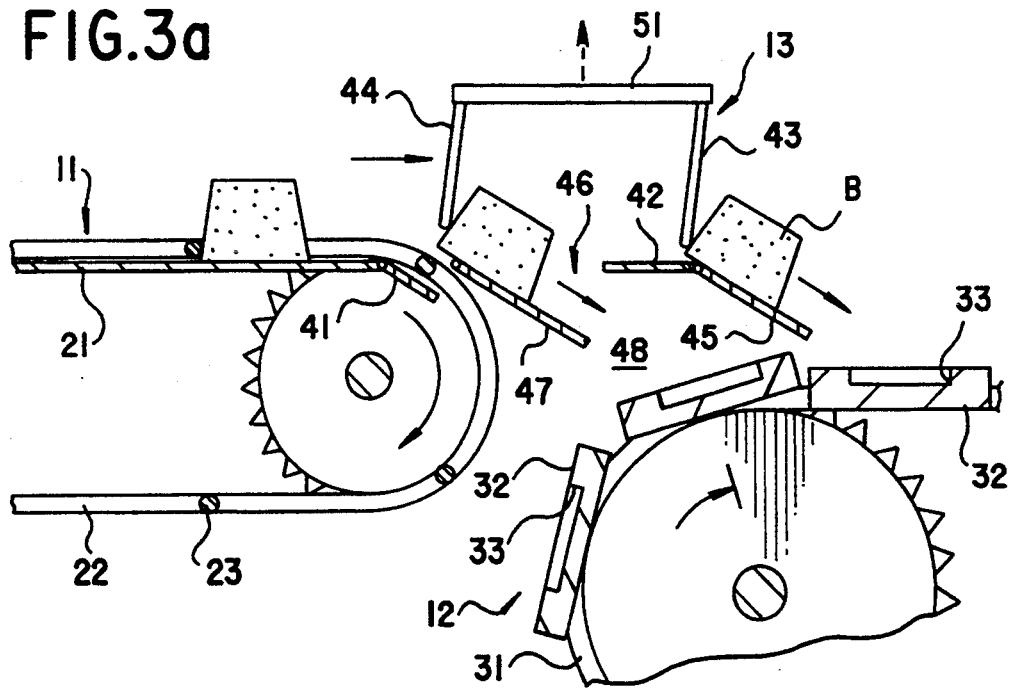
FIGS. 3a, 3b illustrate a second phase of the transport operation of the apparatus of FIG. 1.
Figure 3B:
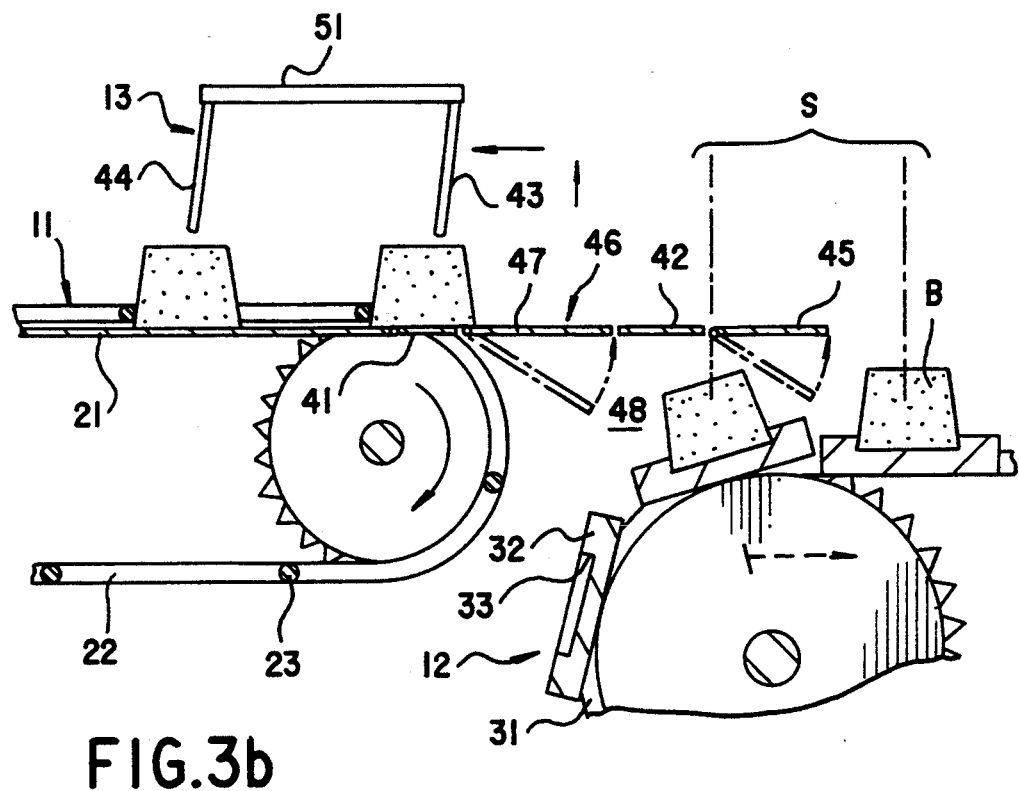

Arranged along the upper path of travel of the holders are a feed station S, FIG. 3b, and a plurality of process stations including unillustrated filling stations. The chains 31 are so driven that two holders 32 are successively stopped at each of stations S. Each of the filling stations S, FIG. 3b, is provided with two filling units, FIG. 2a, for conducting filling operation for the two holders 32 at the same time when the holders are brought to a stop at the station.

The transfer device 13, FIG. 1, comprises a movable bridge plate 41 disposed at the same level as the slide plate 21 and pivotally connecting at one of its ends with the slide plate 21, a horizontal fixed bridge plate 42 flush with the movable bridge plate 41 in a horizontal position, a front main pusher 43 and a rear subpusher 44 which are movable forward and rearward above a front end portion of the first conveyor 11 to the two bridge plates 41, 42 and also movable upward and downward, and a movable chute 45 pivotally connecting with the front end of the fixed bridge plate 42.

The movable bridge plate 41 is pivotally attached at its rear end to the front end of the slide plate 21 pivotably about and is tiltable from the horizontal position to a forwardly downward slanting position. When tilted to the slanting position, the movable bridge plate 41 is free of interference with the push bar 23 of the first conveyor 11.

Provided in the rear of the fixed bridge plate 42 is a by-pass gate 46, having a movable gate plate 47 for opening and closing the gate 46. The gate plate 47 is attached to the rear edge of the by-pass gate 46 pivotably about its rear end and is tiltable from a horizontal position to a forwardly downward slanting position. When in the horizontal position, the gate plate 47 is flush with the fixed bridge plate 42. When brought to the slanting position, the gate plate 47 forms a by-pass 48 along its upper side. The by-pass 48 connects the front end of the movable bridge plate 41 with one of the two holders 32 stopped at the feed station S, i.e., the holder 32 which is positioned upstream with respect to the direction of transport.

The main pusher 43 and the subpusher 44 are suspended, respectively, from the front and rear ends of a connecting member 51 in the form of a horizontal bar and extending longitudinally of the first conveyor 11. The distance between the main pusher 43 and the subpusher 44 is slightly larger than the pitch of the push bars 23. The connecting rod 51 is attached to the piston rod of a hydraulic cylinder 54 supported by a slider 53 on a guide rod 52 extending longitudinally of the first conveyor 11.

The movable chute 45, FIG. 1, is attached to the front end of the fixed bridge plate 42 pivotally about its rear end and is tiltable from a horizontal position to a forwardly downward slanting position. When in the horizontal position, the movable chute 45 is flush with the fixed bridge plate 42. When brought to the slanting position, the movable chute 45 has its lower end opposed to the other of the two holders 32 stopped at the feed station S, i.e,. the holder 32 which is positioned downstream with respect to the direction of transport.

The operation of the transport apparatus will be described with reference to FIGS. 2 and 3.

When the first conveyor 11 operates solid masses B are continuously transported at a predetermined spacing on slide plate 21 by being pushed forward by the push bars 23.

FIG. 2a shows the movable bridge plate 41 ill the slanting position, and the gate plate 47 and the chute 45 in the horizontal position. FIG. 2a also shows one of the solid masses B as transferred onto the gate plate 47 after having been pushed out forward from the first conveyor 11 and moved over the closed bridge plate 41 by the push bar 23. This push bar 23, pushing the solid mass B forward onto the gate plate 47, has moved over the movable bridge plate 41, in the slanting position, without interfering therewith. At this time, the main pusher 43 and the subpusher 44 are in their retracted limit position; the main pusher 43 is positioned immediately behind the solid mass on the gate plate 47, and the subpusher 44 is positioned immediately behind another solid mass B immediately following the mass B on the gate plate 47 and on the first conveyor 11.

Figure 2B:
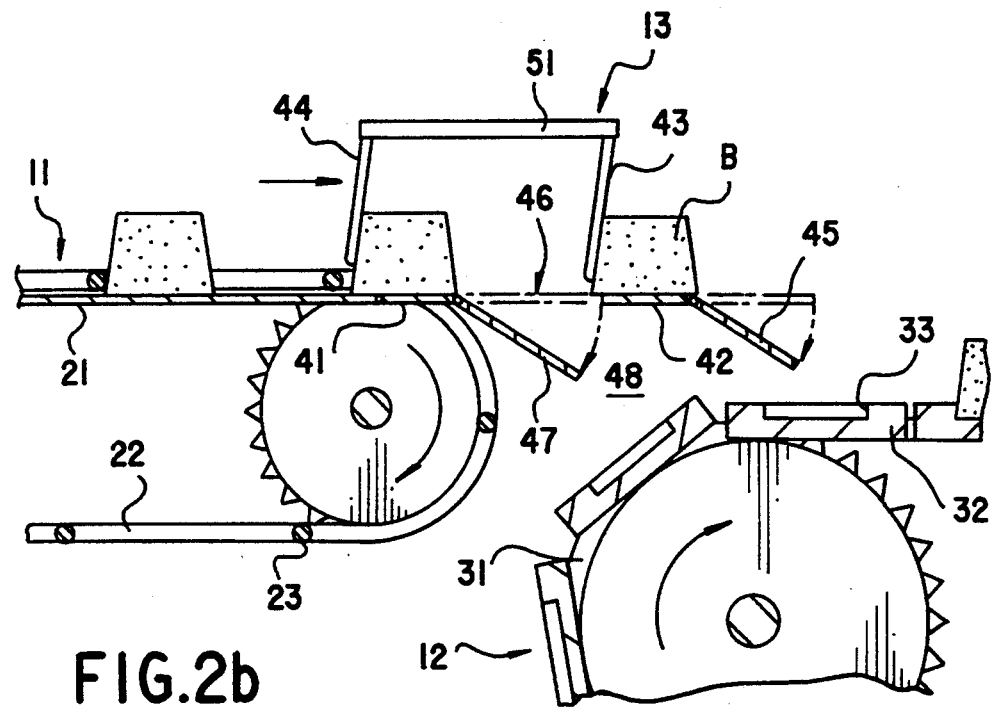

As seen in FIG. 2b, the main pusher 43 and the subpusher 44 start to advance. While FIG. 2b shows the solid mass B to be pushed by the subpusher 44, as positioned on the movable bridge plate 41, the movable bridge plate 41 is brought to the horizontal position after the passage of the push bar 23 over the movable bridge plate 41, in its slanting position, before this solid mass B is positioned on the movable bridge plate 41. When the solid mass B, pushed by the main pusher 43, has passed over the gate plate 47 in the horizontal position, the gate plate 47 and the chute 45 are tilted from the horizontal position.

With reference to FIG. 3a, both pushers 43, 44 are brought to their advanced limit position, whereupon the two solid masses B slide down the gate plate 47 and the chute 45.

The falling two solid masses B are then received and held by two holders 32, respectively, which are stopped at the feed station S, as shown in FIG. 3b, whereupon the gate plate 47 and the chute 45 are brought to the horizontal position, and the pushers 43, 44 rise and return to the retracted limit position. Before or after this, the second conveyor 12 is driven a distance at a time, whereby the two solid masses B as received by the respective holders 32 are fed to the process station at the same time.

Another solid mass is thereafter pushed out from the first conveyor 11 by another push bar 23 and moves over the movable bridge plate 41, whereupon the movable bridge plate 21 is tilted for the apparatus to resume the state shown in FIG. 2a, whereby one cycle of operation is completed.

As described above, the transfer device 13 delivers solid masses B, two at a time, from the first conveyor 11 to the second conveyor 12. Of the two solid masses B transferred at a time, one is pushed out from the first conveyor 11 onto the bridge plate 41 by the subpusher 44, while the other is pushed out beyond the bridge plate 41 by the push bar 23 of the first conveyor 11 and thereafter pushed by the main pusher 43. Accordingly, the pushers 43, 44 can be smaller in stroke length, for example, than in the case where two solid masses B are pushed out from the first conveyor by the two pushers 43, 44.

What is claimed is:

1. An apparatus for transporting solid masses comprising:
    a continuously drivable first conveyor having a transport path extending forward, said first conveyor including a horizontal solid plate for placing solid masses thereon, a pair of endless chains disposed on opposite sides of said horizontal slide plate and a plurality of push bars arranged with a predetermined pitch and connected between said chains an intermittently drivable second conveyor having a transport path extending forward from a position in front of said first conveyor, said second conveyor having a plurality of holders arranged with a predetermined pitch in a transport direction and, having means for transporting said holders a distance twice the pitch of said holders each time said holders are transported, a bridge plate for connecting the front end of a transport path of said first conveyor with a front holder of front and rear holders of each two holders stopped at the rear end of said transport path of said second conveyor each time said second conveyor is started and stopped, said bridge plate having a by-pass gate between front and rear ends of said bridge plate, a movable gate plate for opening and closing the by-pass gate for connecting said by-pass gate with a rear holder of said front and rear two holders topped at a rear end of said transport path of said second conveyor when opening the gate and becoming flush with said bridge plate when closing said gate, a main pusher for slidingly pushing a solid mass forward from a front end of said transport path of said first conveyor onto said bridge plate and for pushing out said solid mass forward from a front end of said bridge plate, a subpusher for forwardly pushing another solid mass immediately following said solid mass pushed by said main pusher from said front end of said transport path of said first conveyor to a position over said by-pass gate while said main pusher pushes said solid mass forward, said main pusher and said subpusher are connected to each other by a connecting member disposed to space them apart by a distance greater than the push bars on said chains and effective for each of said pusher bars to be operable to push out a solid mass from a front end of said transport path of said first conveyor onto the bridge plate, and opening closing means for closing said movable gate plate when a solid mass pushed by said main pusher passes over said by-pass gate and opening said gate plate after said passage and by the time said another solid mass pushed by said subpusher reaches a position over said by-pass gate.

2. An apparatus as defined in claim 1 wherein said transport path of said second conveyor is positioned at a level lower than the level of said transport path of said first conveyor by more than a height of said solid mass, and a chute pivotally movable upward and downward at the front end of said bridge plate.

3. An apparatus as defined in claim 1 wherein each of said holders is formed by a slat having a cavity in the upper side of said slot for positioning a solid mass on said slat.

* * * * *